United States Patent
Juma et al.

(10) Patent No.: US 11,290,283 B2
(45) Date of Patent: *Mar. 29, 2022

(54) AUTOMATED REPLACEMENT OF SELF-SIGNED SERVER CERTIFICATES

(71) Applicant: Red Hat, Inc., Raleigh, NC (US)

(72) Inventors: Farah Juma, Toronto (CA); Darran Andrew Lofthouse, Biggleswade (GB)

(73) Assignee: Red Hat, Inc., Raleigh, NC (US)

( * ) Notice: Subject to any disclaimer, the term of this patent is extended or adjusted under 35 U.S.C. 154(b) by 137 days.

This patent is subject to a terminal disclaimer.

(21) Appl. No.: 16/598,387

(22) Filed: Oct. 10, 2019

(65) Prior Publication Data

US 2021/0111905 A1 Apr. 15, 2021

(51) Int. Cl.
*H04L 9/32* (2006.01)
*H04L 9/08* (2006.01)

(52) U.S. Cl.
CPC .......... *H04L 9/3263* (2013.01); *H04L 9/0894* (2013.01); *H04L 9/321* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 10,044,511 B2 | 4/2018 | Gunti et al. | |
| 10,326,755 B2 | 6/2019 | Bhalerao | |
| 2017/0033935 A1* | 2/2017 | Clark | H04L 9/3265 |
| 2017/0171191 A1 | 6/2017 | Cignetti et al. | |

FOREIGN PATENT DOCUMENTS

| | | |
|---|---|---|
| EP | 2545677 B1 | 4/2015 |
| WO | 2010/033125 A1 | 3/2010 |

OTHER PUBLICATIONS

"Replacing an Existing Personal Certificate," IBM, Jun. 27, 2019, https://www.ibm.com/support/knowledgecenter/en/SSEQTP_9.0.5/com.ibm.websphere.base.doc/ae/tsec_sslreplaceselfsigncert.html.
"Replace Default Self-Signed Certificates (Oracle ILOM)," Oracle, 2019, https://docs.oracle.com/cd/E58626_01/html/E58630/z40025961004157004.htm.

* cited by examiner

*Primary Examiner* — Brandon S Hoffman
(74) *Attorney, Agent, or Firm* — Kilpatrick Townsend & Stockton LLP

(57) ABSTRACT

Certain aspects and features provide an automated process for a server switching from a self-signed digital certificate to a digital certificate signed by a trusted certificate authority (CA). During initiation of an encrypted communication session, for example, during a transport layer security (TLS) handshake, upon receiving a client hello message, the server determines if it is using a self-signed digital certificate. If so, the server automatically creates and sends a certificate signing request, receives a CA-signed digital certificate, and replaces the self-signed digital certificate in its key store with the CA-signed digital certificate. The server then includes the new, CA-signed digital certificate in the server hello message sent back to the client to establish the encrypted communication session.

20 Claims, 5 Drawing Sheets

AUTOMATED REPLACEMENT OF SELF-SIGNED SERVER CERTIFICATES

TECHNICAL FIELD

The present disclosure relates generally to cryptographic security for Internet communications. More specifically, but not by way of limitation, this disclosure relates to automatically generating and submitting, in certain circumstances, a certificate signing request to obtain a digital certificate from a trusted certificate authority to authenticate a server's public encryption key.

BACKGROUND

Transport Layer Security (TLS) encrypts data sent over the Internet to ensure that eavesdroppers and hackers are unable to obtain information from Internet communications. TLS is an example of a cryptographic protocol that provides end-to-end security of data sent between applications over the Internet. These protocols use asymmetric cryptography for securely generating and exchanging a session key. Asymmetric cryptography uses a key pair—a public key, and a private key. A session key created using these two keys is then used for encrypting the data transmitted, and for decrypting the data received during a session. Once the session is over, the session key is discarded.

With such protocols, it is desirable that a client connecting to a server be able to validate ownership of the server's public key. This is normally undertaken using a digital certificate issued by a trusted third party known as a certificate authority (CA), which asserts the authenticity of the public key. In some cases, a server may use a self-signed digital certificate which needs to be explicitly trusted by the client and is not verified by a third party. Use of a self-signed digital certificate may be acceptable in private networks or where obtaining a secure certificate from a CA is cost prohibitive or difficult given the level of risk. For example, server builds being staged or tested by a developer may use a self-signed digital certificate since the low level of security warranted for test data does not justify the time and trouble of acquiring a certificate from a CA.

DETAILED DESCRIPTION

Figure 1:
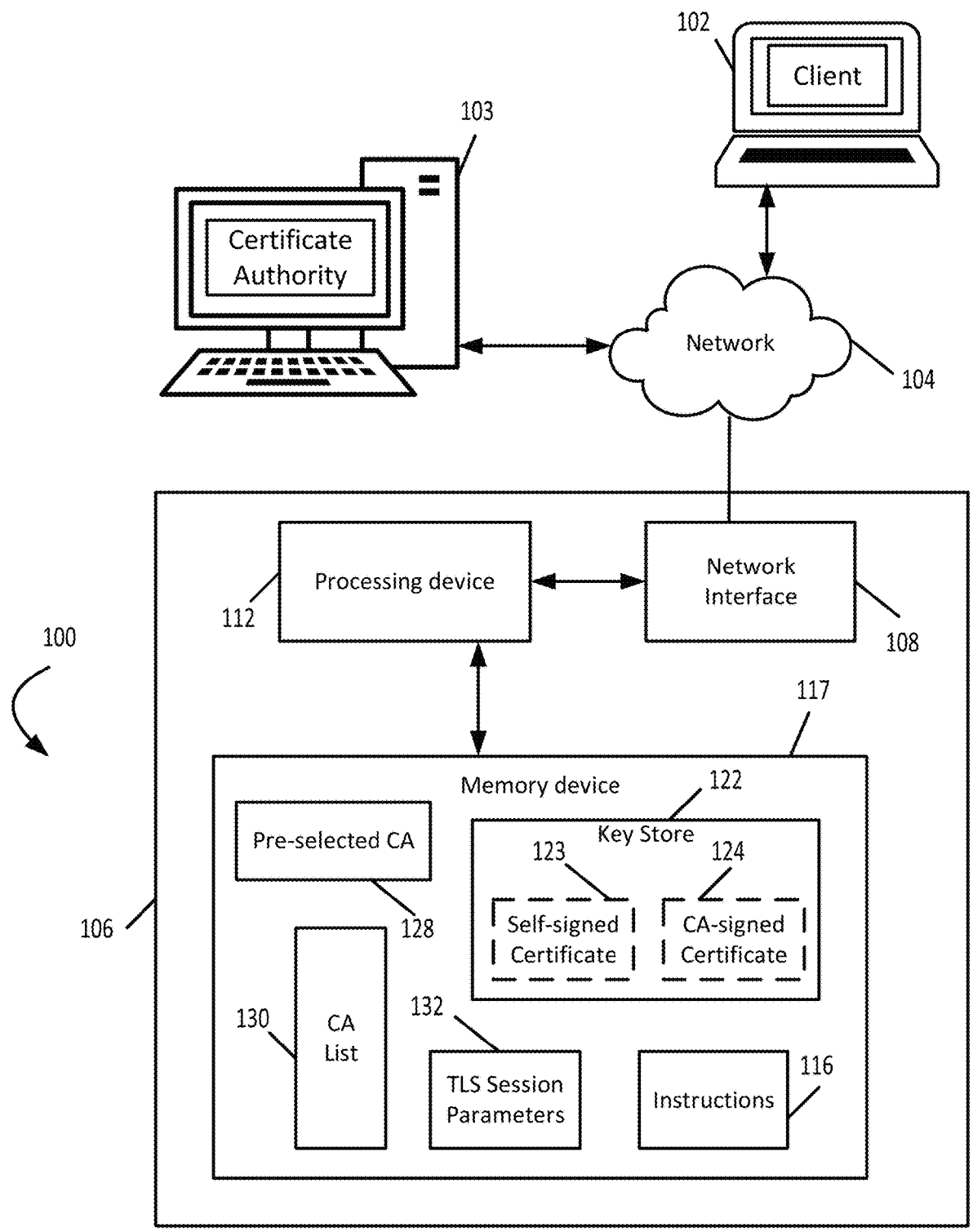
FIG. 1 is a block diagram of an example of a system that provides automated replacement of self-signed server certificates according to at least some aspects of the disclosure.

A self-signed digital certificate for a server's public encryption key is a digital certificate that has been signed by the owner of the server. The use of self-signed digital certificates is generally considered to be bad practice since this practice bypasses the trusted third-party (a certificate authority or CA) that is meant to ensure the identity of the owner of the certificate. When a server's certificate is self-signed, browsers present a warning, requiring end users to manually confirm whether or not to accept the server's certificate. This results in a security risk for end users since they are often prone to just accepting certificates. The users who accept self-signed digital certificates are vulnerable to server impersonation attacks.

Typically, in order to switch from a self-signed digital certificate to a signed digital certificate, a server administrator needs to create a certificate signing request (CSR), submit the CSR to a trusted CA, prove ownership of the domain names to which the CSR applies, obtain a signed digital certificate from the CA, and update the server configuration to make use of the newly obtained signed digital certificate. The number of steps required makes switching to a CA-signed digital certificate a time-consuming and often complex task for server administrators. Server administrators also sometimes forget to replace a self-signed digital certificate that was being used for testing purposes with a signed digital certificate when switching a server build from staging to production.

Some examples of the present disclosure overcome one or more of the issues mentioned above by providing an automated process for switching from a self-signed digital certificate to a certificate signed by a trusted certificate authority. During a handshake to initiate an encrypted communication session, upon receiving a client message, the server retrieves a certificate from a key store. When the retrieved certificate is self-signed, it is not simply sent to the client so that the handshake can continue as normal. Rather, the server automatically creates a CSR, receives a CA-signed digital certificate, and replaces the self-signed digital certificate in its key store with the CA-signed digital certificate. Automating this task allows for easily transitioning a server from a development, testing, or staging server environment, where a self-signed digital certificate is used, to a production environment where a signed digital certificate will be automatically obtained from a trusted certificate authority. This automated process is especially useful for pre-built cloud images, which are generated with self-signed digital certificates but need to use CA-signed digital certificates at runtime. It also improves security for any server. A working Internet connection for the CSR and response messaging is almost guaranteed since the session initiation would not be detected without Internet connectivity. Since the server obtains a CA-signed digital certificate the first time a connection is attempted, it never participates in an encrypted communication session with a self-signed digital certificate in normal use.

In some examples, a processing device coupled to a memory in a server executes instructions for accessing, upon initiation of an encrypted communication session between a server and a client, an existing digital certificate corresponding to a public key assigned to the server and detecting a signature status for the existing digital certificate. When the signature status indicates that the existing digital certificate is a self-signed digital certificate, the processing device generates a certificate signing request and sends, using a network interface, the certificate signing request to a certificate authority (CA). The server receives, using the network interface, a CA-signed digital certificate authenticating the public key assigned to the server. The CA-signed digital certificate is sent to the server in response to the certificate signing request. The processing device replaces the existing digital certificate in the key store for the server with the CA-signed digital certificate.

In some examples, the certificate authority is pre-selected by a server administrator from a plurality of available certificate authorities that can authenticate a domain electronically and provide a signed digital certificate almost immediately. In at least some examples the cryptographic communication session is a TLS session, which is initiated when the server receives a message from a client indicating the client's identity and that a TLS session is being requested. As an example, such a message is sometimes referred to as a client hello message. The server retrieves the existing digital certificate from the key store. If the existing digital certificate is a valid, CA-signed digital certificate, the server sends a response to the client accepting the request and providing the existing digital certificate. As an example, such a response is sometimes referred to as a server hello message. Otherwise, the server automatically obtains the CA-signed digital certificate from the CA, and includes the new, CA-signed digital certificate received in response to the certificate signing request in the response to establish the TLS session.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 in which automated replacement of self-signed server certificates takes place. System 100 includes a client computer 102, in this example, a laptop or notebook computer. Client computer 102 is connected to network 104, which in some examples is the Internet. Also connected to network 104 is a server 106. Server 106 provides encrypted connections over network 104, including, for example, TLS connections to client computer 102 using network interface 108. Server 106 includes processing device 112 can execute computer program code, also referred to as instructions or program code instructions 116, executable by the processing device 112 for performing operations of replacement of self-signed server certificates according to aspects of this disclosure. Processing device 112 is communicatively coupled to network interface 108 and to the memory device 117. The processing device 112 can include one processing device or multiple processing devices. Non-limiting examples of the processing device 112 include a field-programmable gate array (FPGA), an application-specific integrated circuit (ASIC), a microprocessor, etc. The processing device 112 can execute one or more operations for automated replacement of self-signed server certificates as directed by program code instructions 116 stored in the memory device 117. The processing device 112 causes messages following a standard communication protocol to be sent through network interface 108 to other servers or clients running on network 104.

Still referring to FIG. 1, memory device 117 can include one memory device or multiple memory devices. The memory device 117 can be non-volatile and may include any type of memory device that retains stored information when powered off. In some examples, at least some of the memory device can include a non-transitory computer-readable medium from which the processing device 112 can read instructions 116. A computer-readable medium can include electronic, optical, magnetic, or other storage devices capable of providing the processing device with computer-readable instructions 116 or other program code. Non-limiting examples of the memory device 117 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions. Although FIG. 1 depicts a certain arrangement of components for illustrative purposes, other examples can include any number and combination of these components arranged in any suitable configuration.

Continuing with FIG. 1, memory device 117 includes key store 122 configured with digital certificates, which may include at various times, self-signed digital certificate 123 or CA-signed digital certificate 124. Memory device 117 also includes, the pre-selected certificate authority 128 and a list 130 of certificate authorities to choose from should a user need to select a different automated CA to provide a digital certificate. Memory device 117 in this example also stores session parameters 132, which include the identifiers and status of clients participating in communication sessions at any given time.

Figure 2:
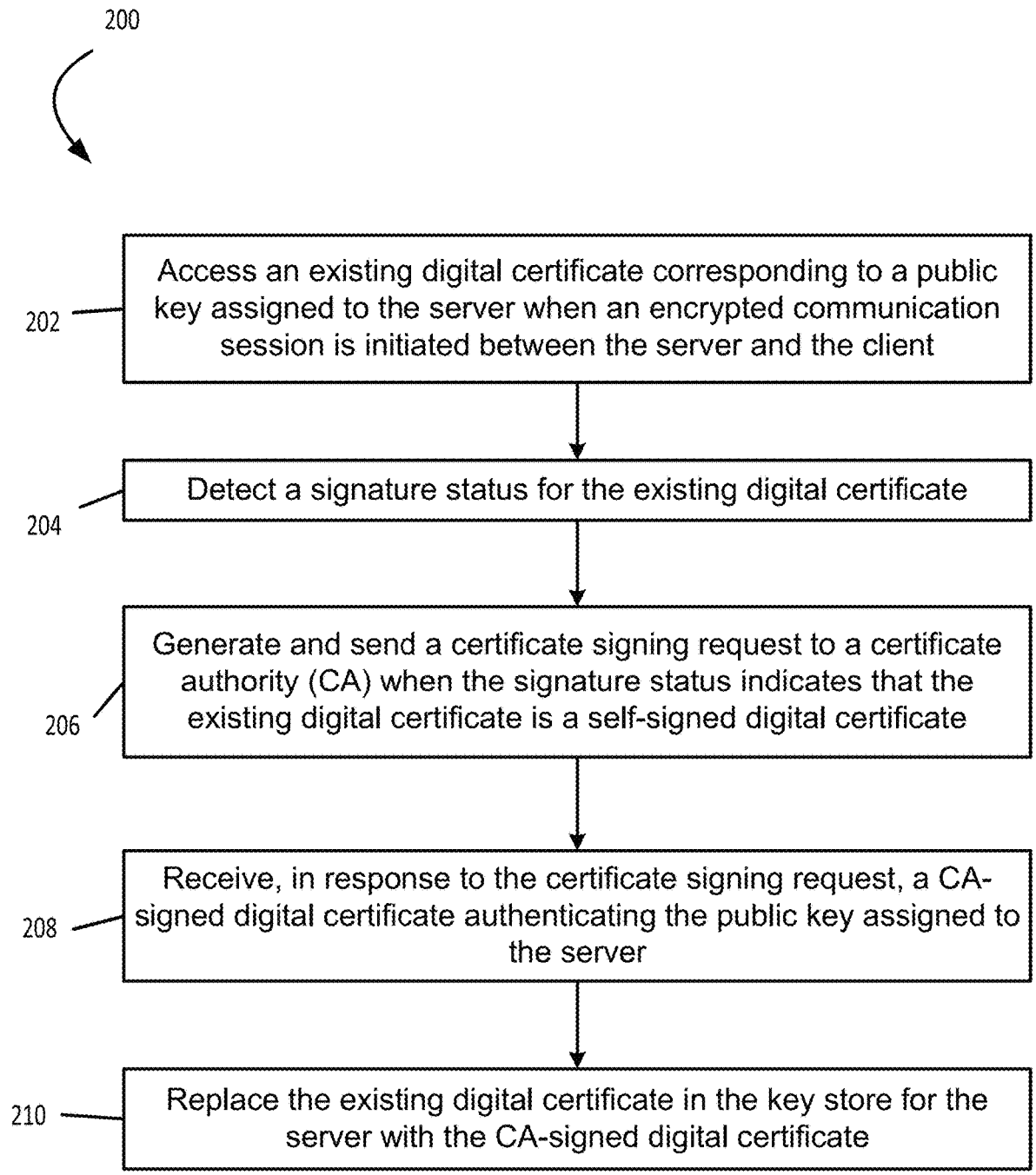
FIG. 2 is a flowchart of an example of a process of automated replacement of self-signed server certificates according to at least some aspects of the disclosure.

In some examples, a processing device (e.g., processing device 112) can perform one or more of the operations shown in FIG. 2 to provide automated replacement of self-signed server certificates according to some aspects of the disclosure. In other examples, the processing device can implement more operations, fewer operations, different operations, or a different order of the operations depicted in FIG. 2. Process 200 of FIG. 2 is described below with reference to components discussed above. At block 202, processing device 112 accesses an existing digital certificate corresponding to a public key assigned to the server. The processing devices access the existing digital certificate when an encrypted communication session is initiated between the server and the client. At block 204, processing device 112 detects a signature status for the existing digital certificate by examining the stored fields of the digital certificate to determine the identity of the certificate's signing authority. The signature status in this example can either be a status of self-signed (signed by the domain that corresponds to the server), or a status of CA-signed. Based on the status being self-signed, the processing device automatically generates and sends, at block 206, over the network interface 108, a certificate signing request to a CA. The CSR is generated using information from the self-signed certificate. The request is then processed by CA server 103, the selected certificate authority (CA) server connected to network 104. At block 208, server 106 receives, in response to the certificate signing request, a CA-signed digital certificate authenticating the public key assigned to the server. At block 210, processing device 112 replaces the existing digital certificate in the key store 122 in memory device 117 with the CA-signed digital certificate.

The process described above of automatically replacing a self-signed certificate at session initiation can be applied to any cryptographic protocol, as digital certificates are not protocol specific. TLS has already been mentioned. As another example, the process can also be applied to the secure sockets layers (SSL) protocol. The following examples illustrate the process with TLS.

Figure 3:
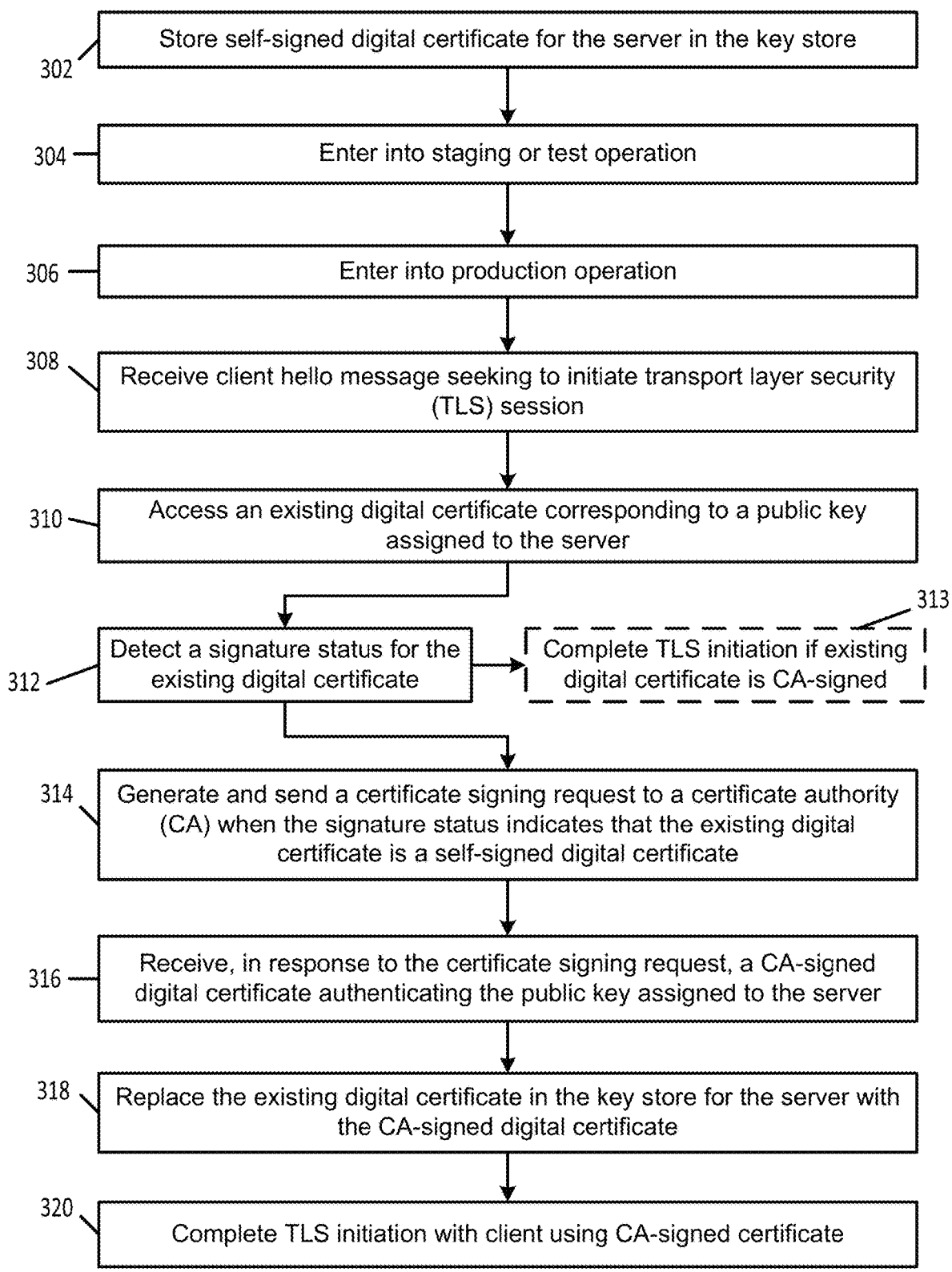
FIG. 3 is a flowchart of another example of a process of automated replacement of self-signed server certificates according to at least some aspects of the disclosure.

FIG. 3 is a flowchart of another example of a process 300 of automated replacement of self-signed server certificates according to at least some aspects of the disclosure. In the example of FIG. 3, automated digital certificate replacement is performed based on transitioning a server from a testing or staging server environment, where a self-signed digital certificate is used, to a production environment, such that a signed digital certificate will be automatically obtained from a trusted certificate authority to be used for TLS sessions in the normal course of operation of the server. At block 302, the server stores a self-signed digital certificate for the server, in part by accepting user input self-signing the digital certificate. At block 304, the server is placed into a staging or test operation by a user. At block 306, the server build is ready and the server enters into production (normal) operation. At block 308, the server, for the first time in production operation, receives a client hello message seeking to initiate a transport layer security (TLS) session. At block 310, processing device 112 accesses an existing digital certificate corresponding to a public key assigned to the server. In this particular example, the digital certificate is self-signed digital certificate 123 in key store 122 of server 106.

Still referring to FIG. 3, at block 312, the processing device 112 detects a signature status for the existing digital certificate and determines whether the existing digital certificate is a self-signed digital certificate or a CA-signed digital certificate. If it is determined by processing device 112 that the existing certificate is a CA-signed digital certificate 124 because any self-signed digital certificate was previously replaced, the TLS initiation is completed immediately by server 106 sending a server hello message to the client using the existing CA-signed digital certificate 124 at block 313. If it is determined that the digital certificate is a self-signed digital certificate, the CSR is sent at block 314 over network interface 108 to the CA automatically. After the CA's server processes the CSR, a CA-signed digital certificate authenticating the public key assigned to the server is received at block 316. At block 318, processing device 112 replaces the existing digital certificate in the key store 122 for the server with the CA-signed digital certificate. At block 320 TLS initiation is completed with the client relying on the CA-signed digital certificate, which is included in a server hello message to the client. TLS as shown herein is an example.

In at least some examples, in order for the process described above to work in an automated fashion, an automated CA is used. An automated CA can provide signed digital certificates by automatically verifying ownership of the domain for the server making the request. There are number of ways the CA can validate a domain. As one example, the CA server may ask the domain server to provision a DNS record under its domain or provision an HTTP resource, either one of which can be done automatically. The CA server can then provide a token to the domain server. The domain server can make use of this token along with a key fingerprint to provision the resource. The CA can then access the provisioned resource and verify that it contains the expected content based on the token that was given.

Figure 4:
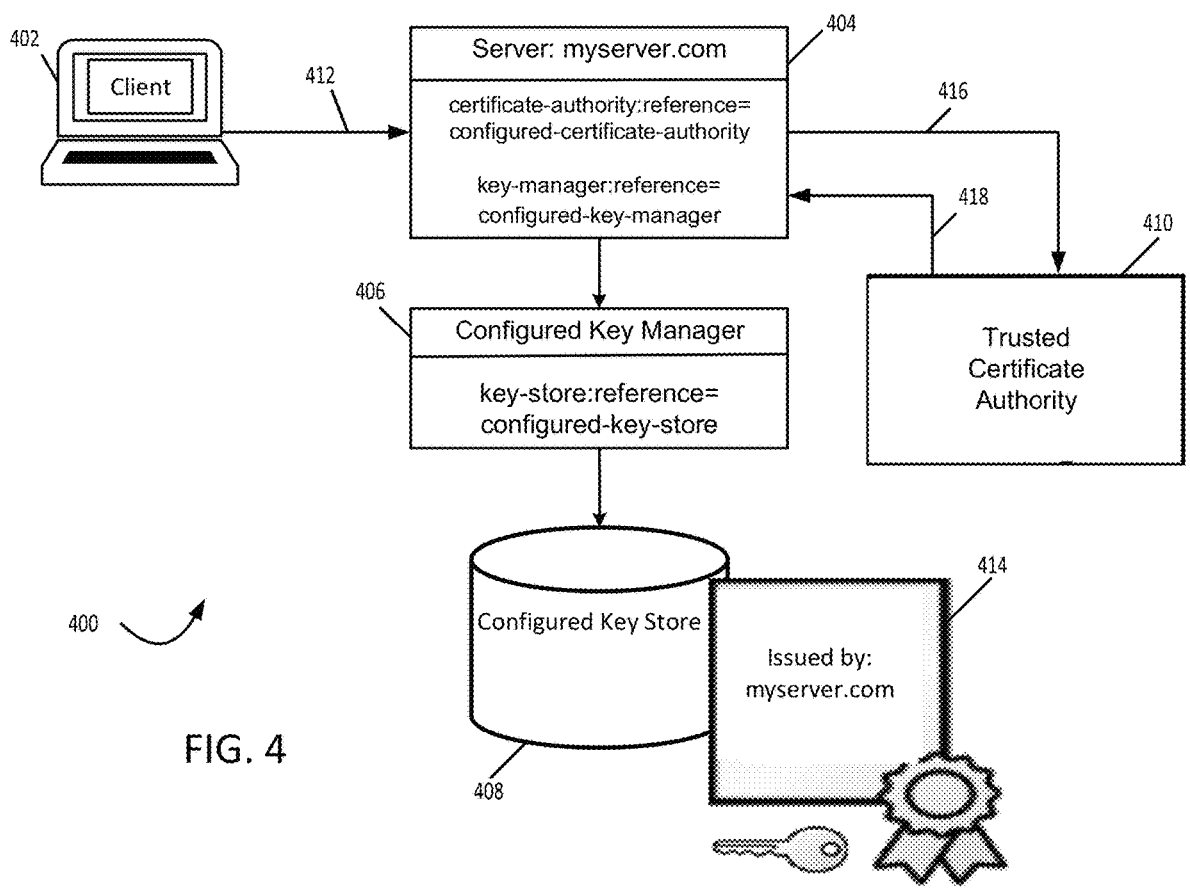
FIG. 4 and FIG. 5 are entity flow diagrams showing automated replacement of a self-signed server certificate according to some aspects of the disclosure.
Figure 5:
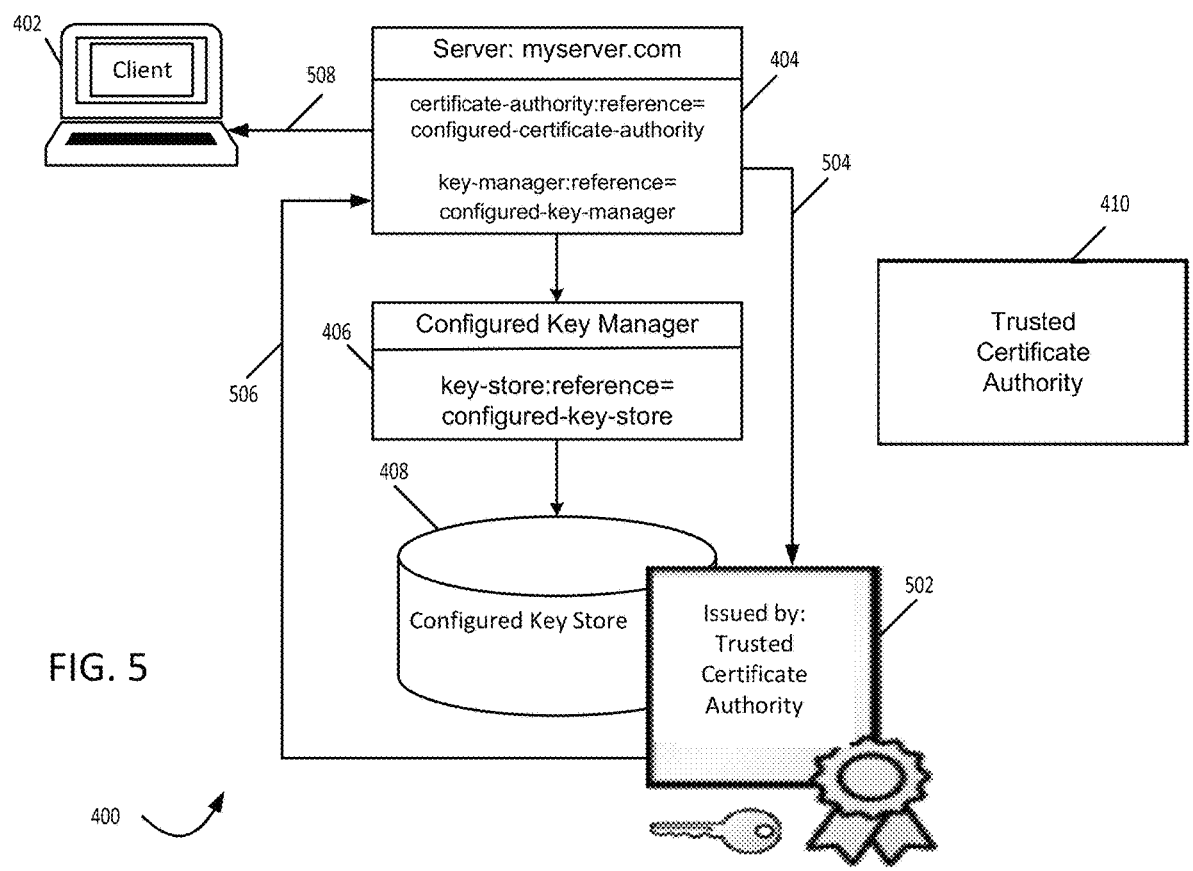

FIG. 4 is an entity flow diagram showing, as an example, the initiation of a TLS session and action upon detection of a self-signed digital certificate. System 400 includes client 402, server 404, configured key manager 406, configured key store 408, and trusted certificate authority 410. Server 404 references configured key manager 406, which in turn references configured key store 408. The server resides at myserver.com and is configured to use the pre-selected CA 410 using a certificate-authority:reference tag. The configured key manager 406 is configured to use configured key store 408 using a key-store:reference tag. When client hello message 412 is received by server 404, upon detecting the self-signed digital certificate 414 issued for and by myserver.com, server 404 generates and sends a CSR message 416 and receives a CA-signed digital certificate message 418 from the configured, trusted CA. FIG. 5 is an entity flow diagram showing actions related to the establishment of the TLS session. In this example, the actions shown in FIG. 5 occur after the messaging shown in FIG. 4 has taken place. Digital certificate 502 is placed by server 404 into configured key store 408. The digital certificate 502 is also routed back into the TLS initiation process as shown by internal signaling paths 504 and 506. Server hello message 508 is then sent to client 402. Server hello message 508 includes the CA-signed digital certificate 502, issued by trusted certificate authority 410.

Unless specifically stated otherwise, it is appreciated that throughout this specification that terms such as "operations," "processing," "computing," "accessing," and "determining" or the like refer to actions or processes of a computing device, such as one or more computers or a similar electronic computing device or devices that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. Some examples can be combined with other examples to yield further examples.

The invention claimed is:

1. A server comprising:
   a processing device; and
   a memory device including instructions that are executable by the processing device for causing the processing device to perform operations comprising:
      accessing, upon initiation of an encrypted communication session between the server and a client, an existing digital certificate corresponding to a public key assigned to the server;
      detecting a signature status for the existing digital certificate;
      generating a certificate signing request for a certificate authority (CA) based on the signature status indicating that the existing digital certificate is signed by an owner or an administrator of the server;
      receiving a CA-signed digital certificate in response to the certificate signing request, the CA-signed digital certificate authenticating the public key assigned to the server; and
      replacing the existing digital certificate in a key store for the server with the CA-signed digital certificate.

2. The server of claim 1 wherein the instructions are executable for causing the processing device to perform an operation of accessing the certificate authority from a list comprising a plurality of available certificate authorities.

3. The server of claim 1 wherein the operations further comprise self-signing the existing digital certificate as part of testing or staging a build for the server.

4. The server of claim 3 wherein the operations further comprise placing the server into production on a network prior to initiation of the encrypted communication session.

5. The server of claim 4 wherein the instructions are executable for causing the processing device to perform operations comprising:

receiving a message from the client to initiate the encrypted communication session;

based on receiving the message, retrieving the existing digital certificate from the key store; and sending a response to the message to the client, the response being for establishing the encrypted communication session.

6. The server of claim 5 wherein the response includes the existing digital certificate when the signature status indicates that the existing digital certificate is a CA-signed digital certificate.

7. The server of claim 5 wherein the response includes the CA-signed digital certificate when the signature status indicates that the existing digital certificate is signed by the owner or the administrator of the server.

8. A method comprising:

accessing, by a processing device, upon initiation of an encrypted communication session between a server and a client, an existing digital certificate corresponding to a public key assigned to the server;

detecting, by the processing device, a signature status for the existing digital certificate;

generating, by the processing device, a certificate signing request for a certificate authority (CA) based on the signature status indicating that the existing digital certificate is signed by an owner or an administrator of the server;

receiving, by the processing device, a CA-signed digital certificate in response to the certificate signing request, the CA-signed digital certificate authenticating the public key assigned to the server; and replacing, by the processing device, the existing digital certificate in a key store for the server with the CA-signed digital certificate.

9. The method of claim 8 wherein the certificate authority is pre-selected from a plurality of available certificate authorities.

10. The method of claim 8 further comprising self-signing the existing digital certificate as part of testing or staging a build for the server.

11. The method of claim 10 further comprising placing the server into production on a network connected to a network interface prior to initiation of the encrypted communication session.

12. The method of claim 11 further comprising:

receiving a message from the client to initiate the encrypted communication session;

based on receiving the message, retrieving the existing digital certificate from the key store; and sending a response to the message to the client, the response being for establishing the encrypted communication session.

13. The method of claim 12 wherein response includes the existing digital certificate when the signature status indicates that the existing digital certificate is a CA-signed digital certificate.

14. The method of claim 12 wherein the response includes the CA-signed digital certificate when the signature status indicates that the existing digital certificate is signed by the owner or the administrator of the server.

15. A non-transitory computer-readable medium comprising program code that is executable by a processing device for causing the processing device to:

access, upon initiation of an encrypted communication session between a server and a client, an existing digital certificate corresponding to a public key assigned to the server;

detect a signature status for the existing digital certificate;

generate a certificate signing request for a certificate authority (CA) based on the signature status indicating that the existing digital certificate is signed by an owner or an administrator of the server;

receive a CA-signed digital certificate in response to the certificate signing request, the CA-signed digital certificate authenticating the public key assigned to the server; and replace the existing digital certificate in a key store for the server with the CA-signed digital certificate.

16. The non-transitory computer-readable medium of claim 15 wherein the program code is executable for causing the processing device to access the certificate authority from a list comprising a plurality of available certificate authorities.

17. The non-transitory computer-readable medium of claim 15 wherein the program code is executable by the processing device for causing the processing device to:

self-sign the existing digital certificate as part of testing or staging a build for the server; and place the server into production on a network prior to initiation of the encrypted communication session.

18. The non-transitory computer-readable medium of claim 17 wherein the program code is executable by the processing device for causing the processing device to:

receive a message from the client to initiate the encrypted communication session;

based on receiving the message, retrieve the existing digital certificate from the key store; and send a response to the message to the client, the response being for establishing the encrypted communication session.

19. The non-transitory computer-readable medium of claim 18 wherein the response includes the existing digital certificate when the signature status indicates that the existing digital certificate is a CA-signed digital certificate.

20. The non-transitory computer-readable medium of claim 18 wherein the response includes the CA-signed digital certificate when the signature status indicates that the existing digital certificate is signed by the owner or the administrator of the server.

* * * * *